United States Patent
Hakura et al.

(10) Patent No.: US 7,441,087 B2
(45) Date of Patent: Oct. 21, 2008

(54) SYSTEM, APPARATUS AND METHOD FOR ISSUING PREDICTIONS FROM AN INVENTORY TO ACCESS A MEMORY

(75) Inventors: Ziyad S. Hakura, Mountain View, CA (US); Brian Keith Langendorf, Benicia, CA (US); Stefano A. Pescador, Sunnyvale, CA (US); Radoslav Danilak, Santa Clara, CA (US); Brad W. Simeral, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 406 days.

(21) Appl. No.: 10/920,610

(22) Filed: Aug. 17, 2004

(65) Prior Publication Data

US 2006/0095677 A1    May 4, 2006

(51) Int. Cl.
  *G06F 9/26* (2006.01)
  *G06F 12/00* (2006.01)
(52) U.S. Cl. ..................... 711/137; 710/244
(58) Field of Classification Search ............... None
  See application file for complete search history.

(56) References Cited

U.S. PATENT DOCUMENTS

| | | | | |
|---|---|---|---|---|
| 6,101,568 A | * | 8/2000 | Richardson | 710/310 |
| 6,557,081 B2 | * | 4/2003 | Hill et al. | 711/137 |
| 6,782,457 B2 | * | 8/2004 | Hill et al. | 711/158 |
| 7,032,076 B2 | * | 4/2006 | Sprangle et al. | 711/137 |
| 2001/0014928 A1 | * | 8/2001 | Chrysos et al. | 710/244 |
| 2002/0023204 A1 | * | 2/2002 | Barowski et al. | 712/239 |
| 2003/0158883 A1 | * | 8/2003 | Drudis et al. | 709/102 |

OTHER PUBLICATIONS

U.S. Appl. No. 09/791,417, filed Feb. 23, 2001.
U.S. Appl. No. 10/674,618, filed Sep. 29, 2003, Danilak.
U.S. Appl. No. 10/712,520, filed Nov. 12, 2003, Danilak.

* cited by examiner

*Primary Examiner*—Hyung Sough
*Assistant Examiner*—Duc T Doan
(74) *Attorney, Agent, or Firm*—Cooley Godward Kronish LLP

(57) ABSTRACT

A system, apparatus, and method are disclosed for managing predictive accesses to memory. In one embodiment, an exemplary apparatus is configured as a prediction inventory that stores predictions in a number of queues. Each queue is configured to maintain predictions until a subset of the predictions is either issued to access a memory or filtered out as redundant. In another embodiment, an exemplary prefetcher predicts accesses to a memory. The prefetcher comprises a speculator for generating a number of predictions and a prediction inventory, which includes queues each configured to maintain a group of items. The group of items typically includes a triggering address that corresponds to the group. Each item of the group is of one type of prediction. Also, the prefetcher includes an inventory filter configured to compare the number of predictions against one of the queues having the either the same or different prediction type as the number of predictions.

21 Claims, 5 Drawing Sheets

SYSTEM, APPARATUS AND METHOD FOR ISSUING PREDICTIONS FROM AN INVENTORY TO ACCESS A MEMORY

BRIEF DESCRIPTION OF THE INVENTION

This invention relates generally to computing systems and their memory, and more particularly, to managing the issuance of predictions from an inventory.

BACKGROUND OF THE INVENTION

Prefetchers are used to fetch program instructions and program data so that a processor can readily avail itself of the retrieved information as it is needed. The prefetcher predicts which instructions and data the processor might use in the future so that the processor need not wait for the instructions or data to be accessed from system memory, which typically operates at a slower rate than the processor. With a prefetcher implemented between a processor and system memory, the processor is less likely to remain idle as it waits for requested data from memory. As such, prefetchers generally improve processor performance.

Generally, the more predictions generated by a prefetcher, the more likely that the prefetcher can arrange to have the necessary instructions and data available for a processor, thereby decreasing the latency of a processor. But conventional prefetchers typically lack sufficient management of the prediction process, and therefore are prone to overload computational and memory resources when the amount of predicted addresses exceeds what the prefetchers can handle. So to prevent resource overload, traditional prefetchers tend to be conservative in generating predictions so as not to generate an amount of predictions that could overload the prefetcher.

In view of the foregoing, it would be desirable to provide a system, an apparatus and a method for effectively managing predictive accesses to memory.

SUMMARY OF THE INVENTION

A system, apparatus, and method are disclosed for managing predictive accesses to memory. In one embodiment, an exemplary apparatus is configured as a prediction inventory that stores predictions, the prediction inventory comprising a number of queues. Each of these queues is configured to maintain predictions until a subset of the predictions is either issued to access a memory or filtered out as redundant. In another embodiment, the prediction inventory also comprises an inventory manager configured to control each of the number of queues in accordance with a queue attribute. One or more of the queue attribute can include one or more of the following: a type of queue, an expiration time, a queue size, an insertion indicator indicating a manner to insert an incoming prediction into a full queue, and a priority with which to select a next prediction.

In another embodiment, an exemplary prefetcher predicts accesses to a memory. The prefetcher comprises a speculator for generating a number of predictions and a prediction inventory, which includes queues each configured to maintain a group of items. The group of items typically includes a triggering address that corresponds to the group of items. Each item of the group is of one type of prediction. Also, the prefetcher includes an inventory filter configured to compare the number of predictions against at least one of the queues having the same prediction type as the number of predictions. In some cases, the inventory filter is configured to compare the number of predictions against at least one other of the queues having a different prediction type. For example, a number of forward sequential predictions can be filtered against a back queue, or the like.

In yet another embodiment of the present invention, an exemplary method for issuing predictions to access a memory is disclosed. This method comprises determining a type of prediction associated with a subset of predictions, matching at least one prediction from the subset of predictions against at least one item in a queue, and storing other predictions from the subset as items in said queue. In a specific embodiment, the method further comprises issuing a next item from the items to access said memory and filtering the next item post-inventory.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF EXEMPLARY EMBODIMENTS

Figure 1:
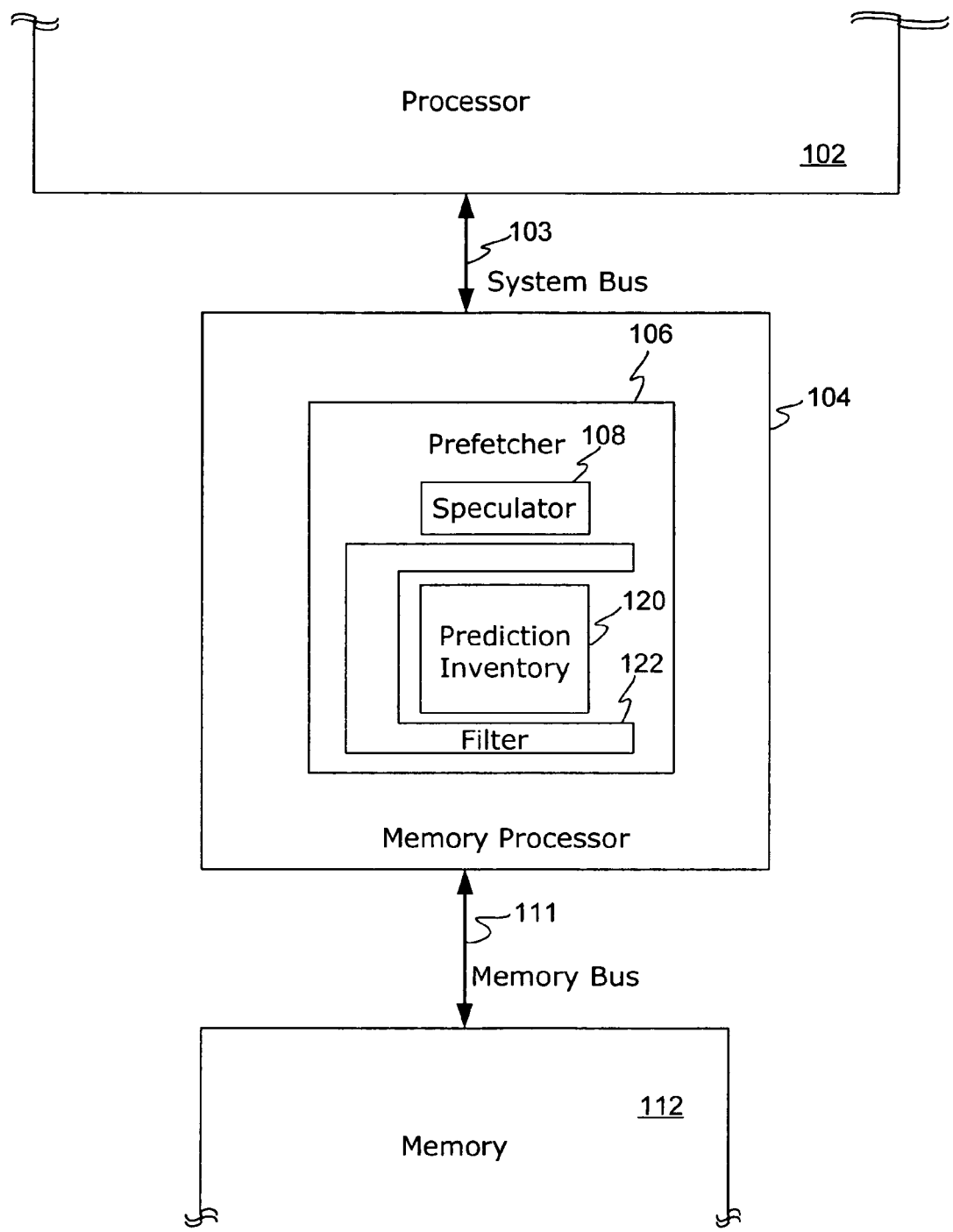
FIG. 1 is a block diagram illustrating an exemplary prediction inventory within a memory processor, according to a specific embodiment of the present invention.

FIG. 1 is a block diagram illustrating an exemplary prediction inventory 120, according to a specific embodiment of the present invention. In this example, prediction inventory 120 is shown to reside within a prefetcher 106. Further, prefetcher 106 is shown to operate within a memory processor 104, which is designed to at least control memory accesses by one or more processors. Prefetcher 106 operates to "fetch" both program instructions and program data from a memory 112 before being required, and then provide the fetched program instructions and program data to a processor 102 upon request by that processor. By fetching them prior to use (i.e., "prefetching"), processor idle time (e.g., the time during which processor 102 is starved of data) is minimized. Prefetcher 106 also includes a speculator 108 for generating predictions and a filter 122 for removing unnecessary predictions.

Filter 122 is representative of either an inventory filter or a post-inventory filter, or both. By removing unnecessary predictions, prefetcher 106 can preserve computational and memory resources that otherwise would be used to manage the duplicative predictions needlessly. An inventory filter (as a pre-inventory filter) operates to remove unnecessary predictions prior to insertion to prediction inventory 120, whereas a post-inventory filter removes unnecessary predictions prior to issuance to memory 112. An example of a post-inventory filter is described in FIG. 5. Next, the operation of prefetcher 106 and its components are discussed next.

In operation, speculator 108 monitors system bus 103 for requests ("read requests") by processor 102 to access memory 112. As processor 102 executes program instructions, speculator 108 detects read requests for addresses that contain program instructions and program data yet to be used by processor 102. For purposes of discussion, an "address" is associated with a cache line or unit of memory that is generally transferred between memory 112 and a cache memory (not shown). A cache memory is an example of a repository of predictions external to the prediction inventory. As such, the "address" of a cache line can refer to a memory location, and the cache line can contain data from more than one address of memory 112. The term "data" refers to a unit of information that can be prefetched, whereas the terms "program instructions" and "program data" respectively refer to instructions and data used by processor 102 in its processing. So, data (e.g., any number of bits) can represent predictive information constituting program instructions and/or program data. Also, the term "prediction" can be used interchangeably with the term "predicted address." When a predicted address is used to access memory 112, one or more cache lines containing that predicted address, as well as other addresses (predicted or otherwise), is typically fetched.

Based on detected read requests, speculator 108 can generate a configurable number of predicted addresses that might likely be requested next by processor 102. Speculator 108 does so by using one or more speculation techniques, examples of which include forward sequential predictions, reverse sequential predictions, back blind sequential predictions, back sector sequential predictions, nonsequential predictions, and the like. According to a specific embodiment of the present invention, a suitable speculator for implementing speculator 108, in whole or in part, is described in U.S. patent application Ser. No. 10/921,026 filed on Aug. 17, 2004, titled "System, Apparatus and Method for Predicting Accesses to a Memory", which is incorporated by reference in its entirety for all purposes.

As speculator 108 can generate numerous predictions to improve its chances of accurately predicting accesses to memory 112 by processor 102, those numerous predictions might include redundant predictions. To remove such redundancies, inventory filter 122 filters out duplicative predictions to generate surviving predictions, which are then stored in prediction inventory 120. To remove redundancies, inventory filter 122 compares generated predictions against the contents of a cache (not shown) prior to inserting those predictions into prediction inventory 120. If a match is found between a prediction and one residing in prediction inventory 120, then inventory filter 122 voids that prediction. But if no match is found, then inventory filter 122 inserts the surviving predictions into prediction inventory 120. Note that it may be the case that some predictions within a new group of predictions (i.e., those generated by one event, or the same trigger address) match the contents of the cache, whereas other predictions do not. In this case, inventory filter 122 voids the individual predictions that match those in the cache and inserts those predictions that were not matched (e.g., not marked as "void") into prediction inventory 120.

Once resident in prediction inventory 120, predictions are maintained as "items" of inventory. The term "item" refers to either a "prediction" or a "triggering address" (which generates the prediction) as stored in prediction inventory 120. These items can be compared against later-generated predictions for filtering purposes. Prefetcher 106 manages these items in inventory while issuing them at varying rates to memory 112. The rate of issuance depends on the type of predictions (e.g., forward sequential predictions, nonsequential predictions, etc.), the priority of each type of predictions, and other factors described below.

One way a prediction can become redundant is if the processor 102 issues an actual read request for a particular address and a prediction for that address already exist in prediction inventory 120. In this case, the prediction is filtered out (i.e., voided) and the actual read request of processor 102 is maintained. This is particularly true for predictions such as sequential-type and back-type predictions. Also, some predictions become redundant between the time prediction inventory 120 receives those predictions until prefetcher 106 issues them to memory 112, prefetcher 106 can also filter out predictions prior to issuing an item. This again decreases the number of redundant predictions arising during the time a duplicate, but later-generated prediction is inserted in prediction inventory 120. And as the number of redundant predictions decreases, the more resources are preserved.

After prefetcher 106 issues the predictions from prediction inventory 120, memory processor 104 transports the remaining predictions (i.e., not filtered out by at least a post-inventory filter) via memory bus 111 to memory 112. In response, memory 112 returns the prefetched data with references to the predicted addresses. A cache memory (not shown), which can reside within or without prefetcher 106, temporarily stores the returned data until such time that memory processor 104 sends that data to processor 102. At an appropriate point in time, memory processor 104 transports prefetched data via system bus 103 to processor 102 to ensure latency is minimized, among other things.

Figure 2:
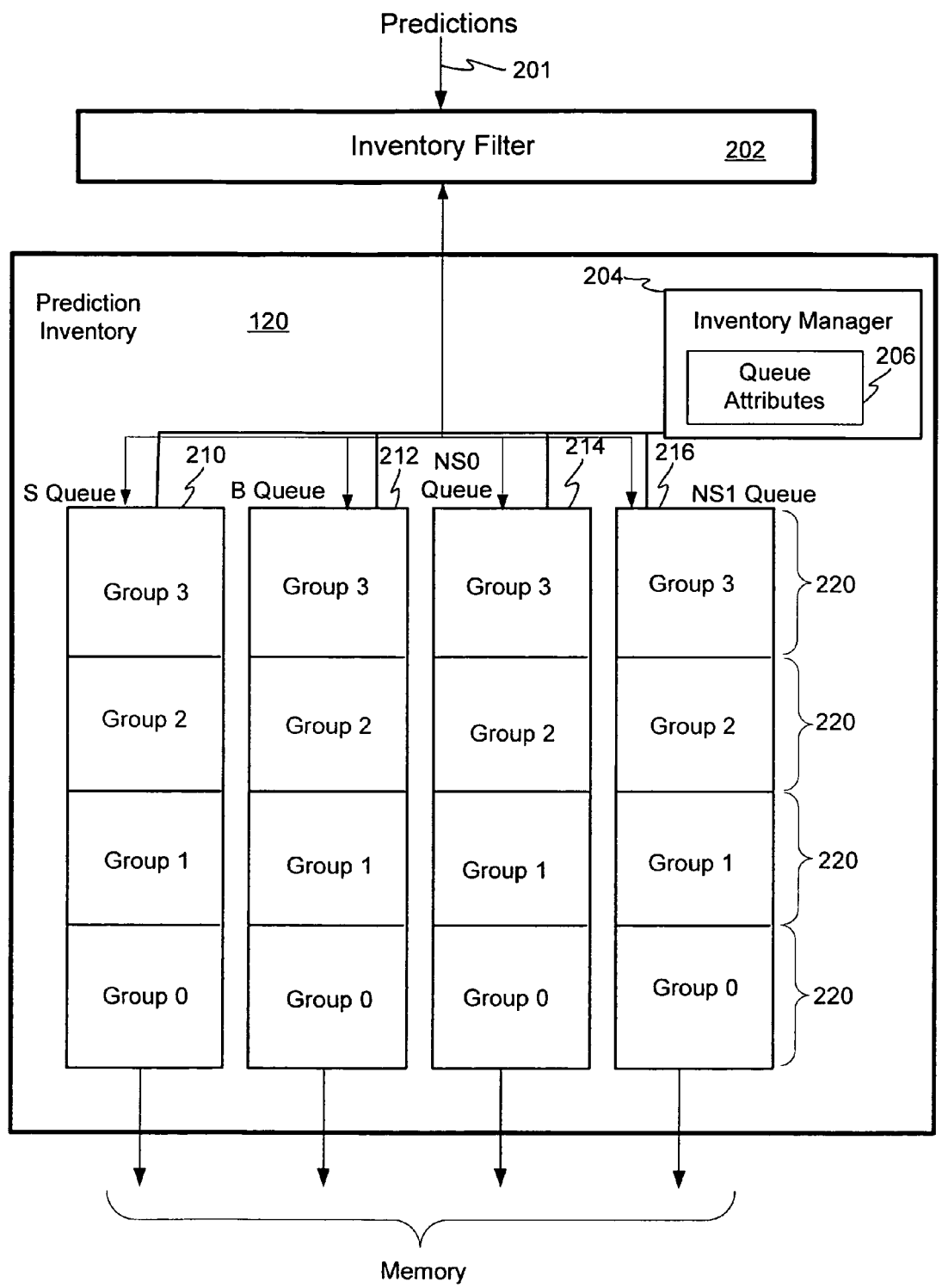
FIG. 2 depicts an exemplary prediction inventory in accordance with one embodiment of the present invention.

FIG. 2 depicts an exemplary prediction inventory 120 in accordance with one embodiment of the present invention. Prediction inventory 120 contains a number of queues 210, 212, 214 and 216 for storing predictions, where a queue can be a buffer or any like component for storing predictions until each is issued or filtered out. Prediction inventory 120 also includes an inventory manager 204 and one or more queue attributes 206, whereby inventory manager 204 configures the structure and/or operation of each of the queues in accordance with corresponding queue attributes 206.

An individual queue maintains predictions as items, all of which are generally of the same particular type of prediction, such as a forward sequential prediction. As shown, prediction inventory 120 includes four queues, a sequential queue ("S Queue") 210, a back queue ("B Queue") 212, a nonsequential zero-queue ("NS0 Queue") 214, and a nonsequential one-queue ("NS1 Queue") 216. Sequential queue 210 can be configured to contain either forward sequential predictions or reverse sequential predictions, whereas back queue 212 can contain either blind back sequential predictions or back sector sequential predictions. For purposes of discussion, note that forward sequential predictions, reverse sequential predictions, and the like can collectively be referred to as "series-type" predictions, whereas blind back sequential predictions, back sector sequential predictions, and the like can collectively be referred to as "back-type" predictions.

Prediction inventory 120 includes a "0th" nonsequential queue and a "1st" nonsequential queue. Nonsequential ("zero-") queue 214 and nonsequential ("one-") queue 216 contain nonsequential predictions having the "highest" and the "second highest" priority, respectively. In particular, nonsequential zero-queue 214 maintains nonsequential predictions, which includes the highest priority target addresses (of any number of target addresses) that can be generated by corresponding trigger addresses. A "trigger" address is a detected address from which speculator 108 generates predictions. Such a prediction (i.e., predicted address) is a "target" address, which is unpatternable (e.g., nonsequential) with the trigger that generates the target. Similarly, nonsequential one-queue 216 maintains nonsequential predictions, but instead includes the second highest priority target addresses that can be generated by corresponding trigger addresses.

Each queue can be composed of any number of groups 220, such as Groups 0, 1, 2 and 3. Each group 220 includes a configurable number of items, such as a triggering address and corresponding predictions that the triggering address generates. For example, groups 220 of sequential queue 210 each can include a triggering address and seven sequential predictions, whereas groups 220 of back queue 212 each can include a triggering address and one back-type prediction (or in some cases, these queues only contain predictions as items). Further, groups 220 of either nonsequential zero-queue 214 or nonsequential one-queue 216, or both, can contain a trigger address and a group of four nonsequential predictions (or in some cases, they only contain predictions as items). In a specific embodiment, speculator 108 determines the number of items per group 220 stored in prediction inventory 120 by setting its "batch" number to generate a specific number of predictions. By storing predictions in prediction inventory 120 as grouped items, groups 220 reduce the amount of information that is typically used to manage each prediction individually, which in turn facilitates arbitration when issuing predictions.

Inventory manager 204 is configured to manage the inventory of items in each queue, as well as control the structure and/or operation of the queues. To manage prediction inventory 120, inventory manager 204 does so, in whole or in part, using one or more queue attributes 206. A first example of a queue attribute is a type of queue. For example, any of queues 210 to 216 can be configured to be a first-in first-out ("FIFO") buffer, a last-in first-out ("LIFO") buffer, or any other type of buffer. The types of queue, such as a FIFO or a LIFO, influence the manner of inserting and removing items in relation to a queue. In one embodiment, sequential queue 210 is configured as a LIFO, and nonsequential zero-queue 214 and nonsequential one-queue 216 each are configured as FIFOs.

A second example of a queue attribute is an expiration time, or a lifetime, which is assignable to a queue, a group, or an item. This attribute controls the degree of staleness for predictions. As predictions in any group 220 or queue ages, or becomes stale, then they will increasingly be less likely to reflect accurate predictions. So to minimize aged items, inventory manager 204 enables a group to maintain its current inventory until a certain expiration time after which inventory manager 204 purges either the entire aged group or any remaining items yet to be issued. In one embodiment of the present invention, a lifetime for a queue, a group, or an item can be configured so as to retain them indefinitely. That is, they can be set as "immortal," which means that immortal predictions will reside in a queue until issued or the immortality is withdrawn. In a specific embodiment, an expiration time is associated with a group when it is inserted into a queue. Thereafter, a timer counts down from the expiration time such that when it reaches zero, any remaining item of that group is invalidated. In yet another embodiment, an expiration time for groups 220 of either nonsequential zero-queue 214 or nonsequential one-queue 216 is set longer than groups 220 of sequential queue 210 to increase the likelihood that a nonsequential prediction will be issued and consequently hit in the data cache.

A third example of a queue attribute is an insertion indicator associated with a queue to indicate how inventory manager 204 is to insert predictions into a queue when that queue is full. In one instance, the insertion indicator indicates whether inventory manager 204 is to either drop a newly-generated prediction from being inserted, or overwrite an old item residing in the particular queue. If the insertion indicator is "drop," then inventory manager 204 will discard any new prediction that otherwise would be inserted. But if the insertion indicator is "overwrite," then inventory manager 204 takes one of two courses of action, depending on the type of queue to which the particular queue corresponds. If the queue is configured as a LIFO, then inventory manager 204 will push the new prediction into the LIFO as a stack, which effectively pushes out the oldest item and/or group from bottom of the LIFO. But if the queue is configured as a FIFO, then the new prediction overwrites the oldest item in the FIFO.

A fourth example of a queue attribute is a priority associated with each of the queues to determine the particular queue from which the next item is to be issued. In one embodiment, a priority order is set relative to each of queues 210, 212, 214 and 216 for arbitrating among the queues to select the next prediction. In applications where series-type predictions are more abundantly generated, servicing sequential queue 210 is important. So, this queue is typically associated with a relatively high priority. This means, for instance, that nonsequential zero-queue ("NS0 Queue") 214 and a nonsequential one-queue ("NS1 Queue") 216 are most likely set to a lower priority relative to sequential queue 210. Another example of a queue attribute is a queue size associated with each of the queues to determine how many predictions can be store temporarily therein. For example, a sequential queue can have size or depth of two groups, a back queue can have a depth of one group, and the nonsequential queues can have a depth of four groups. Note that queue size can control the number of predictions that are issued by prefetcher 106 by controlling how much inventory memory is assigned to the different types of predictions.

The priority of back queue 212 can be dynamically promoted or modified to be higher than that of sequential queue 210, according to one embodiment of the present invention. This feature is at in retrieving predictive information from memory 112 after speculator 108 detects an upper or "front" sector. This is because processor 102 is likely to request a lower or "back" sector shortly after requesting the upper or front sector of the cache line. So by elevating the priority of back queue 212, especially when it is maintaining back sector sequential predictions, there is an increased likelihood that prefetcher 106 will issue the appropriate back sector sequential prediction to memory 112. In a specific embodiment, a back queue counter (not shown) counts the number of items issued from queues other than back queue 212. When this counter reaches a threshold, back queue 212 is promoted to a priority at least higher than sequential queue 210. Then, an item (e.g., a back sector item) can be issued from back queue 212. After it either issues at least one back-type item or back queue 212 becomes empty (e.g., by aging or by issuing all items), the priority of back queue 212 returns (or reverts back) to its initial priority and the back queue counter resets.

Generally for any group 220 of nonsequential group of predictions, there can be a mix of series-type and back-type predictions as target addresses for nonsequential predictions. In particular, the group of nonsequential addresses can include just series-type (i.e., either forward or reverse) predictions. But those groups can also include a number of series-type predictions mixed with a back-type. As an example of the former, consider that speculator 108 determines that a trigger address "A" is associated with a target address "B" and another target address "C." If target address B is of a higher priority than C, then B is maintained in nonsequential zero-queue 214 along with a group of predictions nonsequential to trigger address A. Then, the group can include predictions B0 (i.e., address B), B1, B2 and B3, all of which are nonsequential to address A but are all forward series-type. As an example of the latter, group 220 can include nonsequential predictions B(−1) (i.e., address B-1), B0, B1, and B2, where prediction B(−1) is a back-type prediction mixed with other series-type predictions. Or, group 220 can include any other arrangement of predictions not specifically described herein. Since C has a second higher priority than B, C is maintained in nonsequential one-queue 216 with a similar group of nonsequential predictions. Consequently, predictions B0, B1, B2 and B3 can be inserted as group 3 of nonsequential zero-queue 214, and predictions C0, C1, C2 and C3 can be inserted as group 3 of nonsequential one-queue 216.

FIG. 2 also shows that in one embodiment prediction inventory 120 is configured to receive predictions 201 via inventory filter 202 through which surviving predictions pass. The surviving predictions are then inserted into the appropriate queue and managed by inventory manager 204 as described above. An exemplary inventory filter 202 is described next.

Figure 3:
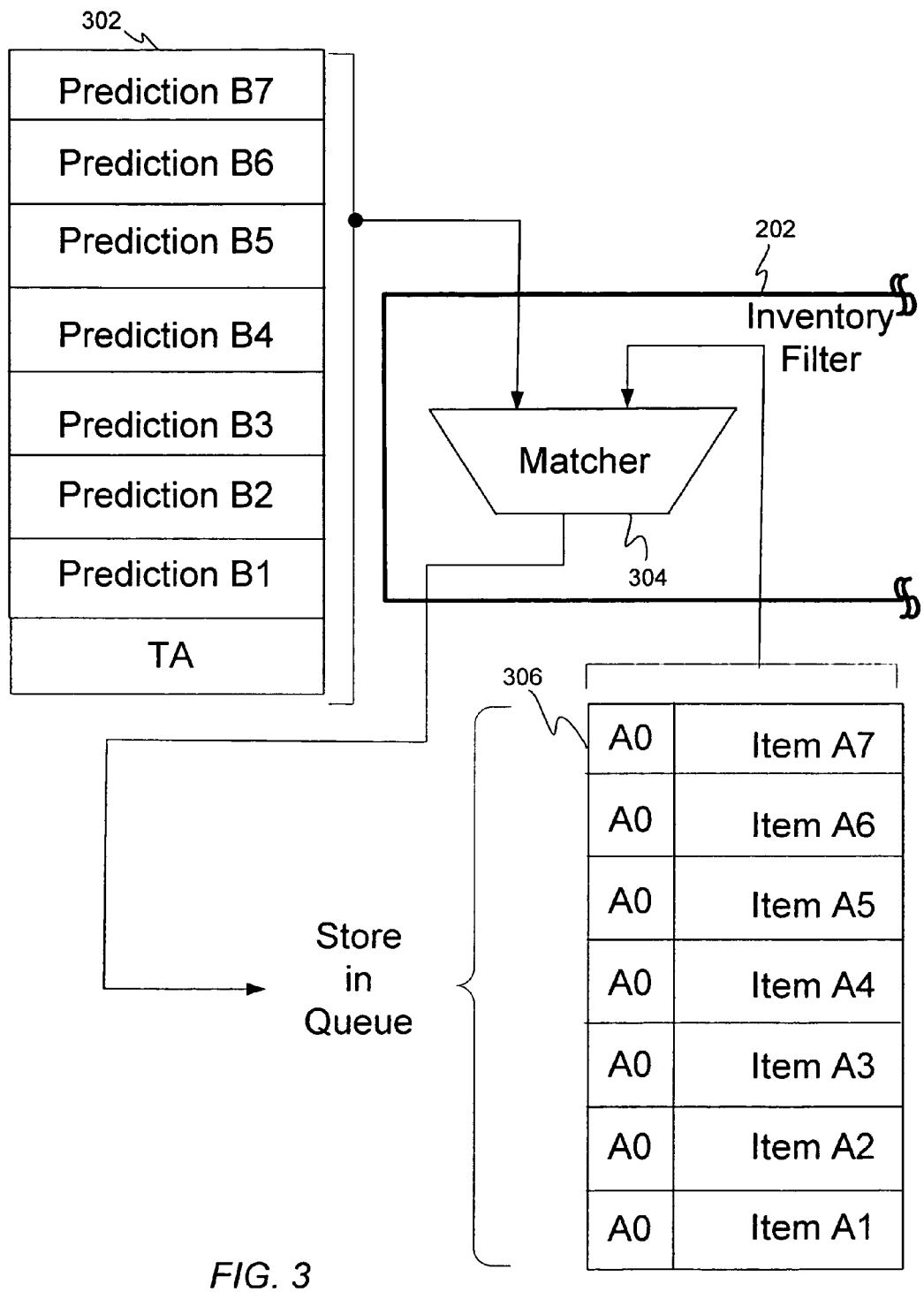
FIG. 3 illustrates an example of an inventory filter in accordance with a specific embodiment of the present invention.

FIG. 3 illustrates an example of inventory filter 202 in accordance with a specific embodiment of the present invention. Although this example applies to filtering forward sequential predictions against a sequential queue, such as sequential queue 210 of FIG. 2, inventory filter 202 can be used in cooperation with any queue to filter any type of prediction. Namely, inventory filter 202 can be configured to compare any number of predictions of any prediction type against at least one other queue that contains predictions of a different prediction type. For example, a number of forward sequential predictions can be filtered against a back queue, or the like. Inventory filter 202 includes at least a matcher 304 to match items in group 306 and a number of predictions 302. Group 306 includes items A1 to A7, each of which are associated with item A0. A0 is the triggering address that previously generated the predictions identified as items A1 to A7. Also, group 306 can reside as any group 220 in sequential queue 210. As for the number of predictions 302, these include "TA" as the triggering address and predictions B1 to B7, all of which were generated by speculator 108 upon detecting address TA. Note that although FIG. 3 shows only one group (i.e., group 306), other groups 220 of the same queue can be filtered in the same manner and at the same time.

In a specific embodiment, matcher 304 is composed of a number of comparators identified as CMP0, CMP1, CMP2, . . . CMPM (not shown). Comparator CMP0 is configured to compare TA against N items in group 306 and comparators CMP1, C2, . . . CMPM each compare a prediction from predictions 302 against a number of N items in group 306, where M is set to accommodate the largest number of predictions generated. As an example, consider that M is seven, thereby requiring seven comparators, and N is three so that each comparator compares one element in 302 to three items in 306. Further, consider that each element of predictions 302 is matched to a corresponding item having the same position (e.g., first to first, second to second, etc.). As such, CMP0 will compare TA against A0, item A1 and item A2, CMP1 will compare prediction B1 against items A1, A2, and A3, and so forth. Number N can be set so as to minimize the amount of comparator hardware, but to sufficiently filter out consecutive streams and those predictions that might result from small jumps (i.e., no larger than N) in the streams of addresses detected on system bus 103.

In one embodiment, a queue stores a page address to represent A0 and offsets each representing item A1, item A2, etc. To determine whether a match exists in this case, the page address of address TA and an offset of a specific prediction from predictions 302 is respectively compared against the page address of A0 and a corresponding offset. In a specific embodiment of the present invention, inventory filter 202 does not filter sequential predictions against nonsequential predictions and therefore does not cooperate with either nonsequential zero-queue 214 or nonsequential one-queue 216. This is because nonsequential speculations may be less likely to have as many redundancies that exist with sequential predictions.

Figure 4A:
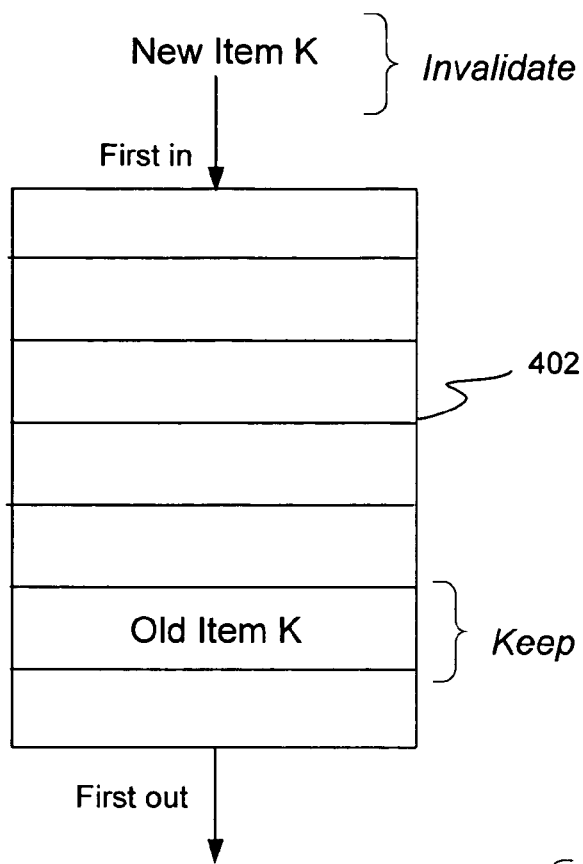
FIGS. 4A and 4B are diagrams illustrating exemplary techniques of filtering out redundancies, according to a specific embodiment of the present invention.
Figure 4B:
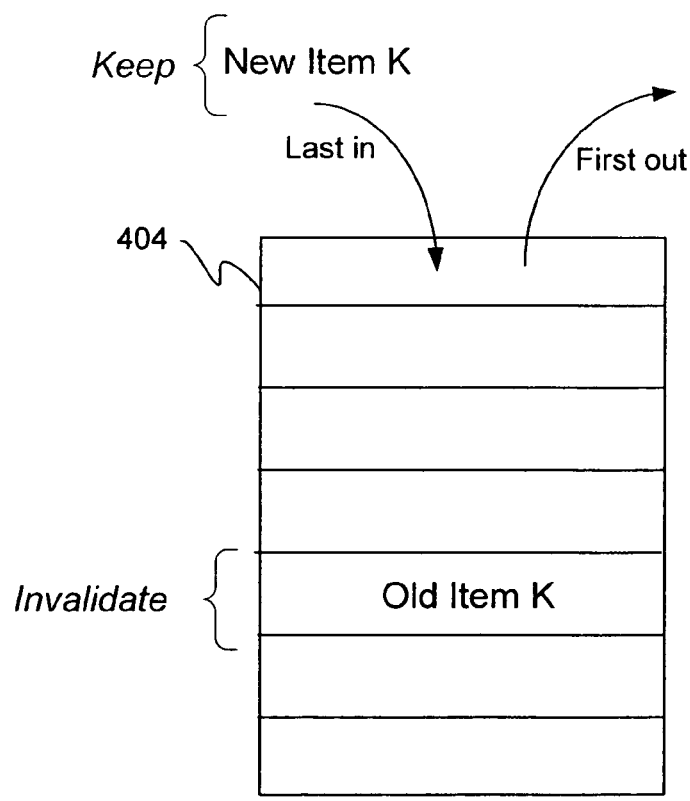

FIGS. 4A and 4B are diagrams illustrating exemplary techniques of filtering out redundancies, according to a specific embodiment of the present invention. Once matcher 304 determines a match, then either the newly-generated prediction (i.e., new item K) or the previously generated item (i.e., old item K) is invalidated. FIG. 4A shows which of either new item K or old item K is filtered out or invalidated. In this case, queue 402 is a FIFO. As such, new item K will be invalidated, thereby keeping old item K. By contrast, FIG. 4B shows that when queue 404 is a LIFO, old item K will be invalidated, thereby keeping new item K. Generally, the earliest issuing of either new item K or old item K will be kept, whereas the one that issues the latest will be invalidated. An ordinarily skill artisan should appreciate that inventory filter 202 can employ other techniques without deviating from the scope and the spirit of the present invention.

Figure 5:
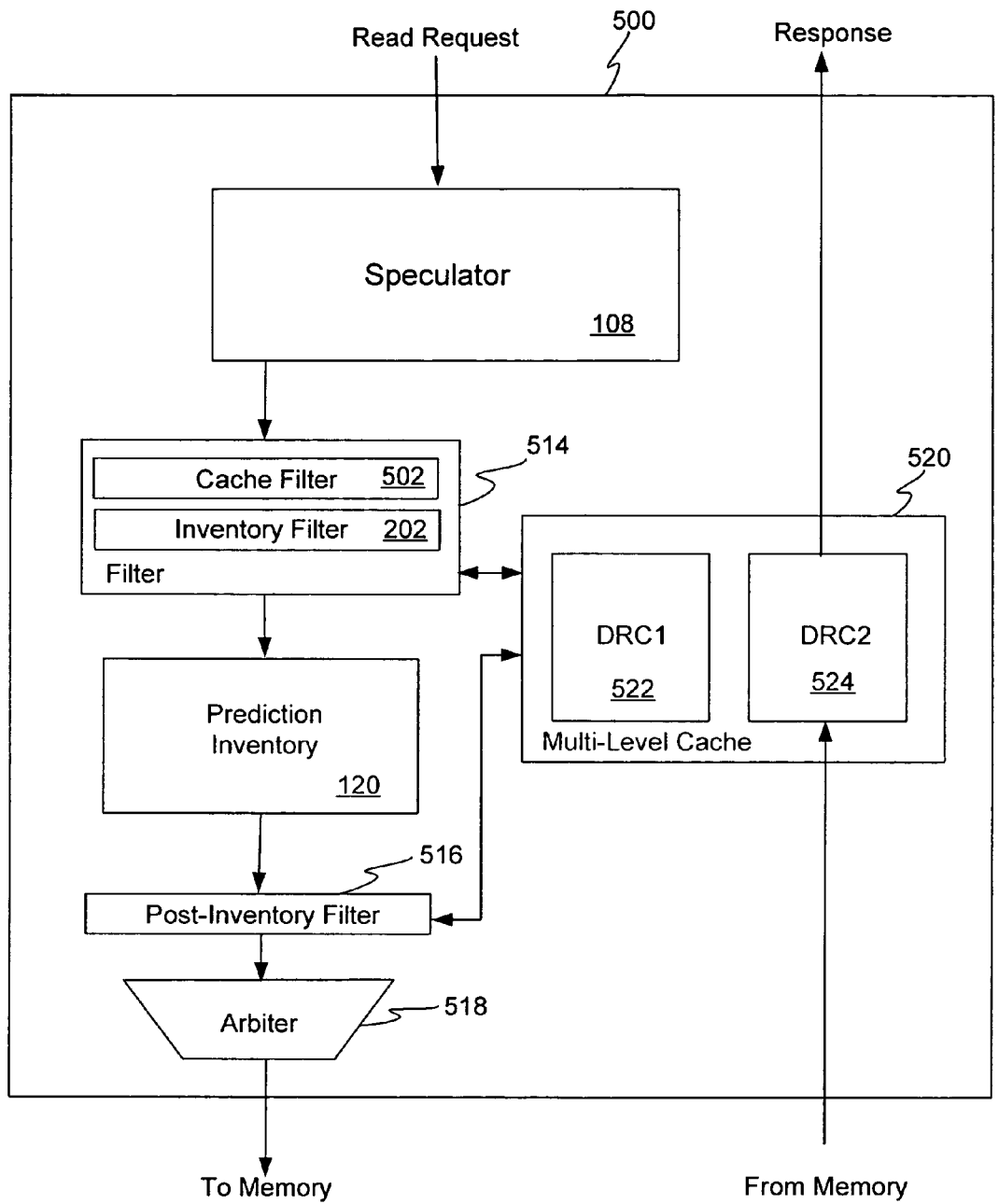
FIG. 5 shows another exemplary prediction inventory disposed within a prefetcher, according to one embodiment of the present invention.

FIG. 5 shows another exemplary prediction inventory disposed within a prefetcher, according to one embodiment of the present invention. In this example, prefetcher 500 includes a speculator 108 and filter 514. Prefetcher 500 of FIG. 5 also includes a multi-level cache 520 and a prediction inventory 120. Here, multi-level cache 520 is composed of a first level data return cache ("DRC1") 522 and a second level data return cache ("DRC2") 524. First level data return cache 522 can generally be described as a short-term data store and second level data return cache 524 can generally be described as a long-term data store. Multi-level cache 520 stores prefetched program instructions and program data from memory 112 until processor 102 requires them. The caches of multi-level cache 520 also store references to the predictions that generated the prefetched predictive information so that newly-generated predictions can be filtered against multi-level cache 520. For example, DRC1 522 and DRC2 524 store two types of information as references in addition to the data for a cache line or unit of memory: (1) the address for a stored cache line that is used to filter against new predictions, and (2) the trigger address in case the cache line was brought into the cache as a result of a prediction. In particular, the trigger address is used to shuffle priorities of the nonsequential predictions in speculator 108.

Prediction inventory 120 provides temporary storage for generated predictions until selected by arbiter 518. The stored predictions in prediction inventory 120 are used to filter out redundancies that otherwise would be issued. Arbiter 518 is configured to determine, in accordance with arbitration rules, which of the generated predictions are to be issued to prefetch instructions and data. Generally, such arbitration rules provide a basis from which to select a particular queue for issuing a prediction. For example, arbiter 518 selects and issues predictions based, in part or in whole, on relative priorities among queues and/or groups.

Filter 514 includes at least two filters: cache filter 510 and inventory filter 202. Cache filter 510 is configured to compare newly-generated predictions to those previous predictions that caused prefetched instructions and data to already become stored in multi-level cache 520. So if one or more of the newly-generated predictions are redundant to any previously-generated prediction with respect to multi-level cache 520, then a redundant prediction is voided so as to minimize the number of predictions requiring processing. Note that a redundant prediction (i.e., the extra, unnecessary prediction) can be the newly-generated prediction. Inventory filter 202 is configured to compare the newly-generated predictions against those already generated and stored in prediction inventory 120. In one embodiment, inventory filter 202 is similar in structure and/or functionality of that shown in FIG. 3. Again, if one or more of the newly-generated predictions are redundant to those previously stored in prediction inventory 120, then any redundant prediction can be voided so as to free up prefetcher resources.

To reduce further the number of redundant predictions, a post-inventory filter 516 is included within prefetcher 500. After or just prior to prefetcher 106 issuing predictions from prediction inventory 120, post-inventory filter 516 filters out redundant predictions that arose between the time prediction inventory 120 first receives those predictions until the time arbiter 518 selects a prediction to issue. These redundancies typically arise because a prediction representing the same predicted address of an item in prediction inventory may have been issued from prediction inventory 120 to a memory, but may not yet have returned any predictive information to cache 520 (i.e., no reference is within cache 520 with which to filter against). In one embodiment, post-inventory filter 516 can be similar in structure and/or functionality of either inventory filter 202 shown in FIG. 3 or cache filter 502.

In one embodiment, post-inventory filter 516 maintains issuance information for each item of each group 220 in prediction inventory 120. In particular, this issuance information indicates which item of a particular group has issued. But post-inventory filter 516 does not remove issued items from prediction inventory 120. Rather, they remain so that they can be compared against when filtering out incoming redundant predictions. As each item in that particular group issues, the issuance information is updated to reflect this. Once all items have been issued, then the group is purged and the queue is freed up to take additional items.

In one embodiment, arbiter 518 can control some aspects of prediction inventory 120 that relate to issuing predictions. In particular, arbiter 518 can modify relative priorities among the queues, groups or items so as to issue the most advantageous predictions. In a specific embodiment, arbiter 518 is configured to effectively modify relative priorities to throttle back the generation of a large number of predictions that overly burdens a memory (i.e., memory over-utilization), such as memory 112, cache memory 520, or other components of the memory subsystem. For example, arbiter 518 can assign a configurable load threshold to each queue. This threshold indicates a maximum rate at which a particular queue can issue predictions. This load threshold is compared against the contents of a workload accumulator (not shown), which maintains the accumulated units of work requested from memory 112. A unit of work is any action requested of memory 112, such as reading, writing, etc. As additional units of work are requested of memory 112, the value in the workload accumulator increases. But as time goes by (e.g., for every certain number of clock cycles), that value decreases. In operation, arbiter 518 compares the load threshold of each queue to the value of the workload accumulator. If the load threshold is surpassed by the workload value, then arbiter 518 performs one of two exemplary actions. Arbiter 518 can instruct prediction inventory 120 to stop taking predictions for that specific queue so that items therein will either be issued or aged out. Or, arbiter 518 can take items out of the queue by overwriting them. Once arbiter 518 detects that the workload value falls below that of the load threshold, the queue will again be available to issue predictions.

According to a specific embodiment of the present invention, a suitable data store for implementing multi-level cache 520, in whole or in part, as well as a suitable a cache filter, is described in U.S. patent application Ser. No. 10/920,995 filed on Aug. 17, 2004, titled "System, Apparatus and Method for Performing Look-Ahead Look Up in Prefetcher Caches", which is incorporated by reference in its entirety, for all purposes. And according to another specific embodiment of the present invention, a suitable speculator for generating nonsequential predictions, in whole or in part, is described in U.S. patent application Ser. No. 10/920,682 filed on Aug. 17, 2004, titled "System, Apparatus and Method for Predicting Nonsequential Accesses to a Memory", which is incorporated by reference in its entirety, for all purposes.

In a specific embodiment of the present invention, prediction inventory 120 and prefetcher 106 are disposed within a Northbridge-Southbridge chipset architecture such that memory processor 104 has at least some of the same functionalities of a Northbridge chip. In a Northbridge implementation, memory processor 104 can also be coupled via an AGP/PCI Express interface to a graphics processor unit ("GPU"). Moreover, system bus 103 can be a front side bus ("FSB") and memory 112 can be a system memory. Alternatively, prediction inventory 120 can be employed in any other structure, circuit, device, etc. serving to control accesses to memory, as does memory processor 104. Further, prediction inventory 120 and its elements, as well as other components of prefetcher 106, can be composed of either hardware or software modules, or both.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A memory processor comprising:
   a speculator generating predictions utilizing a plurality of different types of speculative prediction in parallel including sequential predictions and non-sequential predictions to increase the likelihood of accurately predicting accesses to a memory;
   a prediction inventory including a number of queues each configured to maintain predictions of the same type of prediction, the number of queues including at least one queue that maintains a different type of prediction than maintained in other queues of said number of queues, the types of predictions including at least one of a sequential prediction and one of a non-sequential prediction; and
   a filter configured to filter said predictions by types of predictions and filter out duplicative predictions from the prediction inventory, said filter being coupled to said number of queues, said predictions being maintained in said number of queues until either issued to the memory or filtered out.

2. The memory processor of claim 1 further comprising an inventory manager configured to control each of said number of queues in accordance with one or more queue attributes of:
a type of queue,
an expiration time and
a queue size;
an insertion indicator indicating a manner to insert an incoming prediction into a full queue, and
a priority with which to select a next prediction.

3. The memory processor of claim 2 further comprising an arbiter to modify relative priorities to throttle the generation of predications when a load threshold is exceeded.

4. The memory processor of claim 3 wherein said number of queues further comprises:
a sequential queue, said sequential queue having a sequential queue priority, and
a back queue, said back queue having a back queue priority configurable to indicate a precedence over said sequential queue priority.

5. The memory processor of claim 3 wherein said number of queues further comprises:
a first nonsequential queue having a first priority; and
a second nonsequential queue having a second priority.

6. The memory processor of claim 5 wherein said number of queues further comprises a third or more nonsequential queues each having a unique priority relative to the priorities of the other queues.

7. The memory processor of claim 1 wherein said inventory manager manages predictions by groups, each group including a triggering address and at least one item.

8. The memory processor of claim 1 wherein each of said number of queues is dedicated to maintaining either a sequential prediction or a nonsequential prediction.

9. The memory processor of claim 1 wherein each of said number of queues is configured to be searched for matching said predictions against other predictions external to said number of queues upon issuance.

10. A memory processor comprising:
a speculator generating predictions utilizing a plurality of different types of speculative prediction in parallel including sequential predictions and non-sequential predictions to increase the likelihood of accurately predicting accesses to a memory;
a prediction inventory including a number of queues, the number of queues including at least one queue that maintains a different type of prediction than maintained in other queues of said number of queues with each individual queue dedicated to one of the specific types of predication, each queue configured to maintain a group of items including a triggering address corresponding to said group of items, each item of said group being of one type of prediction, the types of predictions including at least one of a sequential prediction and one of a non-sequential prediction; and
an inventory filter configured to filter said predictions by types of predictions and filter out duplicative predictions from the prediction inventory, said filter being coupled to said number of queues, said predictions being maintained in said number of queues until either issued to the memory or filtered out.

11. The memory processor of claim 10 further comprising an inventory manager configured to identify a match between a prediction and an item from said group of items, wherein said inventory manager voids whichever of either said prediction or said item that is last to access said memory.

12. The memory processor of claim 10 further comprising an arbiter configured to modify relative priorities to throttle the generation of predications when a load threshold is exceeded.

13. The memory processor of claim 10 further comprising:
a cache memory containing predictive information and references; and
a post-inventory filter configured to compare an issued item against said references for filtering out said issued item as a redundant prediction.

14. A method for issuing memory access predictions comprising:
speculatively generating predictions utilizing a plurality of different types of speculative prediction in parallel to increase the likelihood of accurately predicting accesses to a memory;
forming an inventory of predictions arid filtering out duplicative predictions from the inventory, including:
determining a type of prediction associated with a subset of predictions;
matching at least one prediction from said subset of predictions against at least one item in a queue to form a matched prediction, the queue being associated with a prediction inventory including a number of queues, the number of queues including at least one queue that maintains a different type of prediction than maintained in other queues of said number of queues, each queue configured to maintain predictions of the same type of prediction, the types of predictions including at least one of a sequential prediction and one of a non-sequential prediction; and
storing other predictions from said subset as items in said queue;
a filter configured to filter said predictions by types of predictions and filter out duplicative predictions from the prediction inventory, said filter being coupled to said number queues,
said predictions being maintained in said number of queues until either issued to the memory or filtered out.

15. The method of claim 14 further comprising filtering out said matched prediction as a redundant prediction.

16. The method of claim 14 further comprising:
issuing a next item from said items to access said memory;
filtering said next item post-inventory.

17. The method of claim 16 wherein post-inventory filtering comprises:
indicating that said next item is being used to access said memory;
determining that the access to said memory by said next item causes redundant predictive information to be stored in a cache memory; and
removing said next item from said queue.

18. The method of claim 14 further comprising:
detecting that said type of prediction and said items are back-type;
issuing series-type items out from a sequential queue before issuing said items out from said queue; and
issuing one of said items before issuing said series-type items to service said queue.

19. The method of claim 14 further comprising:
detecting that said type of prediction and said items are nonsequential;
issuing other nonsequential items out from a nonsequential queue before issuing said items out said queue; and issuing said items before issuing said other nonsequential items upon detecting that a previously-issued item from said queue is an accurate prediction.

20. The method of claim 14 further comprising modifying a priority associated with said queue, wherein said priority is modified to alter the rate of issuing items from said queue to throttle the generation of predications when a load threshold is exceeded.

21. A computing system configured to manage memory accesses comprising:
    a central processing unit for executing program instructions and processing program data;
    a system memory containing said program instructions and said processing program data; and
    a memory processor coupled to said central processing unit and said system memory and configured to control predictive accesses to said system memory, said memory processor including:
        a speculator generating predictions utilizing a plurality of different types of speculative prediction in parallel including sequential predictions and non-sequential predictions to increase the likelihood of accurately predicting accesses to said system memory to retrieve said program instructions and said processing program data,
        a number of queues, the number of queues including at least one queue that maintains a different type of prediction than maintained in other queues of said number of queues with each queue configured to maintain a group of items including a triggering address corresponding to said group of items, each item of said group being of one type of prediction, the types of predictions including at least one of a sequential prediction and one of a non-sequential prediction,
        an inventory filter configured to compare said number of predictions against at least one of said queues having the same prediction type, and
        a post-inventory filter configured to filter redundant predictions issuing from said queues, said predictions being maintained in said number of queues until either issued to the system memory or filtered out.

* * * * *